United States Patent [19]

Bullard et al.

[11] Patent Number: 4,476,077

[45] Date of Patent: Oct. 9, 1984

[54] PROCESS FOR PREPARING A POLY(P-METHYLSTYRENE) FOAM

[75] Inventors: Edward M. Bullard, Rochester; Daniel J. DiBiasi, Pittsford, both of N.Y.; Frank J. Feeney, East Windsor, N.J.

[73] Assignee: Mobil Oil Corporation, New York, N.Y.

[21] Appl. No.: 331,055

[22] Filed: Dec. 16, 1981

[51] Int. Cl.$^3$ .................................... B29D 27/00
[52] U.S. Cl. ............................ 264/53; 264/DIG. 5; 425/817 C; 521/79; 521/146
[58] Field of Search .............. 264/53, 51, DIG. 5; 521/146, 79; 425/817 C

[56] References Cited

U.S. PATENT DOCUMENTS

| | | | |
|---|---|---|---|
| 3,444,283 | 5/1969 | Carlson, Jr. ........................ | 264/53 |
| 3,751,377 | 8/1973 | Buckner ........................... | 521/146 X |
| 3,770,668 | 11/1973 | Corbett et al. .................... | 264/53 X |
| 3,962,154 | 6/1976 | Egli .................................. | 264/53 X |
| 4,075,265 | 2/1978 | McClung et al. .................. | 264/53 |
| 4,085,073 | 4/1978 | Suh et al. ......................... | 521/146 |
| 4,196,267 | 4/1980 | Watanabe et al. ................. | 264/53 X |
| 4,205,114 | 5/1980 | Canterino et al. ................. | 521/146 X |
| 4,242,465 | 12/1980 | Canterino ......................... | 521/146 X |
| 4,279,848 | 7/1981 | Baxter et al. ..................... | 264/53 |
| 4,360,486 | 11/1982 | DiBiasi et al. .................... | 264/53 X |

Primary Examiner—Philip Anderson
Attorney, Agent, or Firm—Alexander J. McKillop; Michael G. Gilman; James P. O'Sullivan, Sr.

[57] ABSTRACT

A process for preparing a poly(p-methylstyrene) polymer foam including extruding a poly(p-methylstyrene) foam structure from a melt at a temperature which will yield an open cell percentage less than that formed in general purpose polystyrene foamed under the same general conditions. It also includes performing the extrusion from a melt at a rate which will yield a foam structure at least comparable to that of general purpose polystyrene foam, wherein the extrusion rate is greater than the extrusion rate for said polystyrene foam.

5 Claims, 1 Drawing Figure

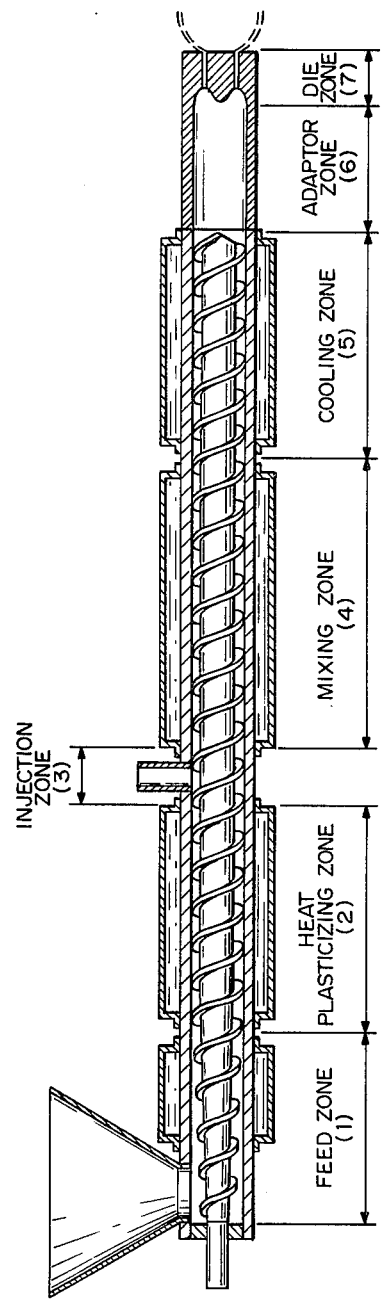

PROCESS FOR PREPARING A POLY(P-METHYLSTYRENE) FOAM

BACKGROUND OF THE INVENTION

This invention is concerned with a process for the extrusion of poly(p-methylstyrene) (PPMS) in foam form to generate a closed cell foam system. More particularly, the invention is concerned with a process for forming PPMS by means of a more efficient process.

DESCRIPTION OF THE PRIOR ART

Polystyrene foam has been in use for a considerable period of time for the manufacture of articles such as meat trays, coffee cups, fast food containers, etc. In the present disclosure, it will be understood that when reference is made to polystyrene, the reference will be to what is known as general purpose or crystal polystyrene which, in the unfoamed state, is a clear, glassy, rigid, amorphous thermoplastic.

Homopolymeric polystyrene foam is made in a continuous process by mixing the polystyrene, nucleating agents, a blowing agent, and heat processing the materials together in a screw extruder. The blowing agent, which will ultimately form tiny gas bubbles during and/or immediately after extrusion, is absorbed by the plastic melt. Pressure exerted by the extruder screw assists in preventing the gas-laden plastic melt from expanding until it exits from the die. The function of the extruder system is threefold: (1) to plasticize the resin to the proper viscosity so that it can absorb the blowing agent, (2) to intimately mix all components together, and (3) to cool the admixture, just prior to extrusion, to a temperature that will permit the formation of a foam of good structure.

A typical method for the direct injection extrusion of polystyrene foam is described in U.S. Pat. No. 3,444,283, which is incorporated in its entirety herein. The process of this patent shows a system employing five zones: (1) a feed zone, wherein subdivided solid polystyrene and an appropriate nucleating agent or nucleating agent combinations are mixed together; (2) a heat plasticizing zone, wherein the mixture is brought to the molten state and the resulting molten mixture then progressed by continuous rotation of a screw to (3) an injection zone, where an appropriate amount of a blowing agent is pumped into the molten resin which is then transferred by the screw mechanism of the extruder to (4) a mixing zone, wherein the combination is heated to from 400° to 450° F., then transferred to (5) a cooling zone, wherein the molten mixture is reduced to a temperature of about 250°–265° F. at a point near the terminal portion of the cooling zone of the extruder. Thereafter, the molten mixture is extruded through an appropriate die, usually a tubular die. The extruded tube is slit into a sheet of foam material and wound onto a take-up mandrel.

While variations may be made in this general process, this technique of forming foamed polystyrene is usually observed. A critical factor in carrying out this process is to maintain careful control over the reduction in temperature down to this extrusion temperature, because if the temperature is too high, the extruded polystyrene will tend to have a high percentage of open cells. A high percentage of open cells results in a weakened foam structure. In addition, the average cell size may be too large and fail to give the foam the proper physical characteristics required for the ultimately formed article.

Cell size is the structural parameter which has the most profound affect on the properties of the foam. A foam structure having an optimum average cell size and a minimum number of open cells is highly desired. While this can be obtained with general purpose polystyrene, it is found that careful control of the operating conditions, particularly temperature of extrusion, must be monitored very carefully or else a foam of high structural quality will not be obtained.

SUMMARY OF THE INVENTION

The present invention relates to a process for foam extruding poly(p-methylstyrene) (PPMS). The process can be described in comparison to the same process for preparing general purpose polystyrene foam. Thus, the process involves (a) forming an admixture comprising a PPMS resin and a nucleating agent; (b) heating the admixture to effect thorough melting of the resin; (c) combining the molten mixture with a blowing agent and thoroughly mixing the same; and (d) extruding the molten mixture at a temperature greater than that yielding a cell count of from about 4 to about 100 in general purpose polystyrene foam. The process also contemplates forming a PPMS foam structure having an open cell percentage of less than about 20% and preferably less than about 10%. The process also contemplates extruding the molten mixture at a rate greater than that yielding the above-identified cell count in general purpose polystyrene foam.

By the present invention, it has been discovered that PPMS can be extruded at about the same temperature as general purpose polystyrene and obtain a cell structure of excellent uniformity with a considerably less percentage of open cells. It has also been discovered that PPMS can be extruded at a greater rate than general purpose polystyrene and, thus, a significant increase in throughput of product, of exceptional quality, can be obtained by the present process. Thus, the extruding can be from a melt having a temperature of from about 270° F. to about 360° F.

A more complete understanding of the process of the present invention may be had from a consideration of the following specification and the accompanying drawing in which:

The FIGURE is a longitudinal sectional view of an illustrative screw extruder apparatus employed in the process of the present invention.

It is to be understood that the apparatus described herein is merely for purposes of illustration and for comparing the process of preparing polystyrene with the process of preparing PPMS. Other apparatus, more particularly suited for the preparation of foamed PPMS is contemplated.

The PPMS contemplated by the present invention may be the 100% homopolymer of p-methylstyrene or the polymer may contain a proportion of, for example, 50% of the m-methylstyrene as part of the structure. Processes are known for the preparation of the mixture of the isomeric methylstyrenes. They may be obtained by the catalytic dehydrogenation of a mixture of the corresponding ethyltoluenes, which, in turn, may be obtained by the selective alkylation process disclosed and claimed in U.S. patent application Ser. Nos. 709,981, filed July 19, 1976, now abandoned and 801,177, filed May 27, 1977, now abandoned, the disclosures of which are incorporated herein by reference.

These processes produce an extremely high proportion of the p-methylstyrene isomer with only a minor proportion of the m-methylstyrene isomer. The almost complete absence of the o-methyl isomer is highly advantageous because this isomer tends to produce undesired byproducts during the dehydrogenation step.

Since the proportion of the paramethylstyrene in the mixture is so high, usually at least 90% by weight, the mixture can be regarded essentially as the para isomer. For convenience, in this specification, the mixture will be referred to as the p-methylstyrene monomer of poly(p-methylstyrene), i.e., PPMS. This will distinguish it from polymers produced by polymerizing the mixture with other, copolymerizable monomers. It should, however, be remembered that the "homopolymer" is, in fact, a copolymer of the isomeric monomers. The general purpose polystyrene referred to herein is the polystyrene employed by the industry in forming sheet foam polystyrene for the ultimate preparation of articles such as meat trays, egg cartons, cups, fast food packages, etc. This material is more particularly defined in publications, such as, the yearly Modern Plastics Encyclopedia, e.g., Vol. 57, No. 10A.

Prior art methods for controlling cell size in foam extrusion have called for the employment of a variety of additives to achieve the desired cell size. The close control of cell size in the final foam product is important in achieving the desired physical characteristics necessary for particular end use applications of the foamed product. For example, when the foam is to be employed in packaging applications, e.g., for the manufacture of molded trays or other types of containers, it is desirable that the foam be resilient and flexible enough to withstand the flexture the containers normally encountered in the mechanical handling of such products. In such applications, if a container is fabricated from a foam material having a relatively coarse cell structure, i.e., over about 25 mils in cell diameter, it is brittle and hence unsuitable for container end use applications. On the other hand, containers fabricated from materials having a very fine cell structure, for example cells having a diameter less than 25 mils, are ideally suited for the use of packaging trays and the like.

By the present invention, the formation of foams of PPMS are obtained which have an exceptionally fine foam structure and a significantly lower percentage of open cells. The physical integrity of the foam structures of the present invention is directly proportional to the percentage of open cells in the foam structure.

In the formation of foamed PPMS, the nucleating agents normally employed with polystyrene can be employed. Particularly preferred is the combination of sodium bicarbonate with organic acids, such as, citric acid, in order to control the foam cell size. The blowing agents employed for the preparation of foamed PPMS also are blowing agents which are employed in the formation of polystyrene. Hydrocarbons, such as, butane, propane, hexane, petroleum ether and halogenated hydrocarbons, e.g. the Freons, are particularly well suited as blowing agents for PPMS because they are exceptionally compatible with this polymer. The foamed PPMS contemplated by the present invention is undoubtedly influenced to a large degree by the polymers greater affinity for hydrocarbon solvents than is polystyrene. For example, the pentane up-take by PPMS is approximately 40%, as compared to about 1-2% for polystyrene. It is not understood exactly what part this affinity plays in the facile formation of the PPMS cell structure at the higher temperatures employed herein as compared to polystyrene. It is believed, however, to be a positive factor. Reference is made to U.S. Pat. Nos. 3,444,283 and 3,482,006 for an indication of the nucleating agents and blowing agents which can be employed in the practice of the present invention. The disclosure of these references are incorporated in their entirety herein.

For the purposes of the present invention, and for a clearer understanding thereof, the extruder will be described with reference to the drawing. The illustrated system is shown comprising seven distinct zones. In zone (1), hereinafter called the feed zone, the polymer charge, admixed with the cell size control additive or nucleation additive, is introduced into the extruder and is carried forward by the forwarding action of the extruder screw to zone (2) or the heat plasticizing zone of the extruder. In this zone, as a result of an increase in root diameter of the forwarding screw, the polymer is compacted. Simultaneously, heated fluids, which are circulated through the temperature control jacket which surrounds the outside surface of the extruder barrel, raise the temperature of the polymer material to effect thorough melting thereof. Next, the now molten polymer is forwarded to zone (3) of the extruder, hereinafter referred to as the injection zone, wherein the blowing agent, e.g., isopentane, is introduced into the extruder utilizing suitable means such as an injection valve. The requisite pressure to achieve introduction of the blowing agent into the molten polymer mass within the injection zone of the extruder need only be sufficiently high to overcome the pressure of the molten polymer at the point of injection into the extruder. The root diameter of the injection zone of the extruder may be either identical to the root diameter of that portion of the screw in the preceding plasticizing zone or may be somewhat less depending upon the type of extrusion equipment employed. Also, rather than injecting the isopentane at a single point in the injection zone, it may be injected at a plurality of points within the zone. Following the injection zone, the mixture of molten polymer and liquid pentane is advanced by rotation of the forwarding screw to zone (4) of the extruder, hereinafter referred to as the mixing zone. In the mixing zone, the liquid blowing agent-molten polymer combination is thoroughly mixed while being forwarded through the extruder to zone (5). In zone (5) of the extruder, hereinafter referred to as the cooling zone, the forwarding screw is characterized as having a constant pitch and constant flight diameter. The extruder barrel throughout the cooling zone of the extruder is cooled by circulation of suitable cooling fluids through the temperature control jacket surrounding this portion of the extruder barrel. The cooling zone of the extruder functions to reduce the temperature of the molten polymer-liquid blowing agent mixture to a temperature at which the material within the extruder may be extruded in the form of a suitable foam structure. This is accomplished by passing the extruder charge material to zone (6), hereinafter referred to as the adaptor zone. In this zone, a more precise reading of the polymer temperature is possible. From the adaptor zone, the molten mixture is passed to die zone (7) through which the material is extruded as a tubular foam sheet.

The following examples will illustrate the process of the present invention wherein a comparison is made between PPMS, made from about 97% of the paraisomer and about 3% of the orthoisomer, and two general purpose polystyrenes identified as Dow 685D and Dow 685 obtained from the Dow Chemical Company, Midland Mich.

EXAMPLES 1-3

Dow 685 polystyrene, PPMS and Dow 685D polystyrene in separate runs were tumble blended with 0.2 weight percent of the nucleating agent citric acid-sodium bicarbonate in a stoichiometric ratio. The surface coated material was then extruded on a 1¼/1½" Gloucester tandem foam extrusion line. This extrusion line is in its basic features the same as that illustrated in the drawing. Isopentane was injected into injection zone (3) and a primary extruder corresponding to mixing zone (4) of the drawing was temperature monitored at 3 regions therein. The molten polymer blowing agent was then transferred to the cooling zone (5) where its temperature was monitored at the entrance thereof and at the exit point thereof just prior to entry into the adaptor zone (6). The mixture was then transferred to adaptor zone (6). Thereafter, the polymer-blowing agent system was extruded through a circular die zone (7) having a gap opening of 15 mils. In all of the examples, the same amount of nucleating agent and approximately the same amount of blowing agent was incorporated into the same amount of polymer. In each case, the forwarding screw mechanism in the mixing zone operated at 45 revolutions per minute and the forwarding screw in the cooling or secondary zone operated at 15 revolutions per minute. The exiting foamed polymer was slit into sheet form and wound onto a mandrel at a rate of 8.5 feet per minute. Thus, the rate of extrusion was the same in all cases. Two runs of the Dow 685 resin were made and extruded at two different temperatures. Three runs of the PPMS were made and extruded at three different temperatures. Two runs of the Dow 685D resin were made and extruded at two different temperatures.

The polymers employed had the following melt strength or melt tension characteristics measured at 210° C. as shown in Table 1.

TABLE 1

| Resin | Melt Index g/10 Min. | Melt Tension at Break, g |
| --- | --- | --- |
| 685 | 2.2 | 4.0 |
| 685D | 1.4 | 6.6 |
| PPMS | 1.8 | 11.3 |

Table 2, below, gives the results for the several runs.

In Table 2, the temperatures given for the mixing zone and cooling zone were not the actual temperatures for the molten polymer at these points because the temperature sensors could not make actual contact with the polymer melt. Likewise, the temperature given for the adaptor is the temperature of the metal surface of the adaptor. The temperature of the adaptor melt is the temperature reading of the molten polymer-blowing agent composition just prior to extrusion.

Table 2 reveals that PPMS can be extruded at approximately the same temperature as Dow 685 (compare Run #1 with Run #1) and the PPMS will have a significantly lower percentage of open cells, 5% versus 11%, the same cell count and at a gauge that is 40% larger, 0.087 versus 0.062. Thus, the art would have been more than justified in foam extruding PPMS under conditons acceptable for crystal grade, i.e., general purpose, polystyrene since a superior product is obtained. However, the data of Table 2 reveals a significant advantage in foam extruding PPMS at temperatures considerably higher than that employed for general purpose polystyrene. As the extrusion temperature of polystyrene increases, the open cell percentage increases dramatically. Dow 685 increased from 11% at 370° F. extrusion temperature to 26% at 338° F. extrusion temperature. Dow 685D increased from 8% at 300° F. extrusion temperature to 21% at 350° F. Both of these foamed sheet materials would have been clearly rejected at an open cell percentage of 20%, since they would have been structurally unacceptable for formation into parts, such as meat trays, cups, fast food containers, etc.

The foamed PPMS extruded from the melt at temperatures of 305° F., 335° F. and 353° F., respectively, had increasingly improved cell count, i.e., 11 to 16 to 22 and at the same time an extremely stable open cell percentage, i.e., increasing only from 5% to 8% to 12%, thus, not progressing to the reject point.

In Table 2, cell count and open cell percentages were obtained by the following procedures:

The cell count was obtained by projecting light through a microtomed section of a sample of the foam and projecting an image of the cell structure onto a frosted glass plate at a magnification of 100 diameters. Counting the displayed cross-section of whole cells as they appear within a 3×3 inch square gives the cell count.

Open cell percentage was obtained by use of a Beckman Model 930 Air-Pycnometer. This device measures the true volume of a sample of the PPMS foam. Percent open cells are measured by subtracting the true volume from the geometric volume, expressed as a percent.

In processing general purpose polystyrene, the screw

TABLE 2

| Polymer | 685 | | PPMS | | | 685D | |
| --- | --- | --- | --- | --- | --- | --- | --- |
| | Run #1 | Run #2 | Run #1 | Run #2 | Run #3 | Run #1 | Run #2 |
| Temp., °F. | | | | | | | |
| Mixing Zone | 320 | 320 | 320 | 320 | 320 | 320 | 320 |
| | 360 | 360 | 360 | 360 | 360 | 360 | 360 |
| | 410 | 410 | 400 | 410 | 415 | 380 | 380 |
| Cooling Zone | 300 | 300 | 300 | 300 | 300 | 300 | 310 |
| | 290 | 290 | 290 | 290 | 290 | 295 | 300 |
| Adaptor | 285 | 340 | 285 | 335 | 360 | 270 | 350 |
| Adaptor Melt | 307 | 338 | 305 | 335 | 353 | 300 | 350 |
| Foam Sheet Properties | | | | | | | |
| Gauge, inches | .062 | .065 | .087 | .077 | .064 | .045 | .052 |
| Cell Count | 11 | 11 | 11 | 16 | 22 | 19 | 10 |
| Open Cell % | 11 | 26 | 5 | 8 | 12 | 8 | 21 | speed of the secondary or cooling extruder, of the type generally described herein, is approximately from about 1/5 to 166 that of the primary screw speed. Ideally, with polystyrene, the cooling screw will gently stir and advance the hot polymer mix so that maximum area will be exposed to the cooled barrel surface. Elaborate special screw designs have been used to maximize cooling and conveying rates, while minimizing shear energy input and screw speed.

For the processing of PPMS according to the present invention, these somewhat stringent requirements, necessary for polystyrene, can be relaxed to a considerable extent. It is not fully understood why this is so, but, it has been found that residence time in the secondary or cooling extruder can be shortened and, consequently, the overall foamed PPMS throughput rate increases significantly. This is accomplished not only with no loss in quality of sheet foam but with a better quality product.

In Table 2, the take-up rate employed was 8.5 feet per minute. This can be considered, for the purposes of this disclosure, a benchmark for the extrusion rate of general purpose polystyrene through the particular apparatus employed under the stated conditions recited in the examples for the several runs. It is clear from Dow 685, Run #2 and Dow 685D, Run #2, that no increase in extrusion rate could advantageously be made. The only result would be foamed product of extremely high open cell percentage made at a faster rate. This is not true, however, for PPMS. This foamed material can be extruded at a higher rate than general purpose polystyrene and with easier control since the temperature of the melt extruded is considerably higher than with polystyrene. The speed of the screw in the cooling zone can be increased from 15 RPM to about greater than 15, e.g., to about 20 RPM and the temperature of the adaptor melt maintained as in Table 2 by appropriate control of the heat exchange fluid in the cooling zone (5). This would permit a take-up rate of greater than 8.5 feet per minute, e.g., up to about 11 feet per minute of PPMS foam of excellent quality. Generally, the speed of the screw could be advantageously increased up to about 30%. The overall weekly, monthly and yearly production increase would be outstanding.

Although the present invention has been described with preferred embodiments, it is to be understood that modifiations and variations may be resorted to, without departing from the spirit and scope of this invention, as those skilled in the art will readily understand. Such variations and modifications are considered to be in the purview and scope of this invention.

What is claimed is:

1. A process for preparing a poly(p-methylstyrene) consisting essentially of 100% homopolymer or containing up to 50% m-methylstyrene with the almost complete absence of the ortho-methyl isomer, in closed cell foam sheet form comprising:
   (a) forming a mixture comprising said poly(p-methylstyrene) and a nucleating agent;
   (b) heating the mixture to effect thorough melting of said resin;
   (c) combining, under pressure, the resin-nucleating agent mixture with a blowing agent to form a melt; and
   (d) extruding a foam structure from said melt at a temperature and at a rate which will yield a foam structure having an open cell percentage of less than about 20% and which will be at least comparable to that of general purpose polystyrene foam, said extrusion rate being greater than the extrusion rate for said polystyrene foam.

2. The process of claim 1 wherein the Melt Index of said poly (p-methylstyrene) and the general purpose polystyrene are generally similar.

3. The process of claim 1 wherein said extruding will yield a foam structure having a cell count greater than about 4.

4. The process of claim 1 wherein said extruding is from a melt having a temperature greater than about 270° F.

5. The process of claim 4 wherein the extruding is from a melt having a temperature between about 270° F. and about 360° F.

* * * * *